(12) United States Patent
Lucey

(10) Patent No.: US 7,135,682 B1
(45) Date of Patent: Nov. 14, 2006

(54) UNCOOLED LONG-WAVE INFRARED HYPERSPECTRAL IMAGING

(75) Inventor: Paul G. Lucey, Honolulu, HI (US)

(73) Assignee: University of Hawai'i, Honolulu, HI (US)

( * ) Notice: Subject to any disclaimer, the term of this patent is extended or adjusted under 35 U.S.C. 154(b) by 0 days.

(21) Appl. No.: 10/913,306

(22) Filed: Aug. 5, 2004

(51) Int. Cl.
*G01J 5/02* (2006.01)
(52) U.S. Cl. .................................. 250/339.02
(58) Field of Classification Search ............ 250/339.02
See application file for complete search history.

(56) References Cited

U.S. PATENT DOCUMENTS 4,976,542 A * 12/1990 Smith .......................... 356/456
5,539,517 A * 7/1996 Cabib et al. ................. 356/456
2003/0071216 A1* 4/2003 Rabolt et al. ........... 250/339.02

\* cited by examiner

*Primary Examiner*—David Porta
*Assistant Examiner*—Marcus Taningco
(74) *Attorney, Agent, or Firm*—Leighton K. Chong; Godbey Griffiths Reiss & Chong

(57) ABSTRACT

A long-wave infrared hyperspectral sensor device employs a combination of an interferometer with an uncooled microbolometer array camera to produce hyperspectral images without the use of bulky, power-hungry motorized components, making it suitable for UAV vehicles, small mobile platforms, or in extraterrestrial environments. The sensor device can provide signal-to-noise ratios near 200 for ambient temperature scenes with 33 wavenumber resolution at a frame rate of 50 Hz, with higher results indicated by ongoing component improvements.

8 Claims, 11 Drawing Sheets
(3 of 11 Drawing Sheet(s) Filed in Color)

UNCOOLED LONG-WAVE INFRARED HYPERSPECTRAL IMAGING

The subject matter herein was developed in part under research contracts provided by the U.S. Government, National Aeronautics and Space Admininstration (NASA), Planetary Instrument Definition and Development Program, Contract Nos. NAGS-10704 and NAGS-12970. The U.S. Government retains certain rights in the invention.

TECHNICAL FIELD

This invention generally relates to long-wave infrared (LWIR) hyperspectral imaging at moderate spectral resolution (~10 $cm^{-1}$).

BACKGROUND OF INVENTION

Hyperspectral imaging in the 8–14 micron region, also known as the thermal infrared or long-wave infrared (LWIR) is assuming increasing importance in military and civilian remote sensing. The day/night capability of LWIR hyperspectral imaging, coupled with its ability to detect camouflaged targets, buried land mines and gaseous chemical agents, make it an attractive reconnaissance tool for military applications. Civil remote sensing benefits from the chemical analytical capabilities of LWIR hyperspectral that complement visible, near-IR and shortwave (VISNIRSWIR) hyperspectral methods. LWIR hyperspectral imaging is more challenging from a sensor design standpoint than VISNIRSWIR instruments because of instrument self-emission and low temperatures required of LWIR photon sensitive focal planes. The power, weight and mass requirements imposed by cooling optics and focal planes raise the initial and recurring cost of systems and limit their applications to platforms that can support the requirements.

Recent advances in uncooled LWIR detector technology, specifically large arrays of microbolometers, have allowed development of uncooled LWIR multispectral imaging systems using relatively broad bands (themis, space imaging). However, the sensitivity of these arrays is insufficient to produce usable true hyperspectral imaging using dispersive or filter techniques. See, Sellar, R. Glenn, Boreman, Glenn D., Kirkland, Laurel E., "Comparison of signal collection abilities of different classes of imaging spectrometers", in Imaging Spectrometry VIII, edited by Shen, Sylvia S., Proceedings of the SPIE, Volume 4816, pp. 389–396 (2002). It would be desirable to enable true hyperspectral imaging in the LWIR with usable signal-to-noise ratio (SNR).

SUMMARY OF INVENTION

In the present invention, an "image plane" interferometer that uses no moving parts is used as a front end to a microbolometer camera having an uncooled thermal IR detector array. The interferometer provides the wavefront division for selected spectral wavelengths required for interferometry. Like a version of an imaging Michelson, the scene is imaged through the interferometer producing a two dimensional image upon which the interference pattern is superimposed. The interference pattern is spatially imposed on the scene rather than temporally. In order to build up a true three dimensional spectral data set, the scene is then scanned by the microbolometer across the interference pattern, in the same sense as a pushbroom imaging spectrometer.

Use of the uncooled microbolometer camera avoids the need for a typical cooled, motorized camera, which can impose unacceptable volume, weight, heat, and power requirements in the intended environments of use. This combination of instruments obtains usable hyperspectral imaging in the LWIR with acceptable to high signal-to-noise ratio (SNR). The savings on volume, weight, and power demand make the instrument suitable for UAV vehicles, small mobile platforms, or extraterrestrial environments. The device can provide signal-to-noise ratios near 200 for ambient temperature scenes with 33 wavenumber resolution at a frame rate of 50 Hz, with higher results indicated by ongoing component improvements.

Other objects, features, and advantages of the present invention will be explained in the following detailed description of the invention having reference to the appended drawings.

BRIEF DESCRIPTION OF DRAWINGS

The patent or application file contains at least one drawing executed in color. Copies of this patent or patent application publication with color drawing(s) will be provided by the Office upon request and payment of the necessary fee.

DETAILED DESCRIPTION OF INVENTION

Figure 1:
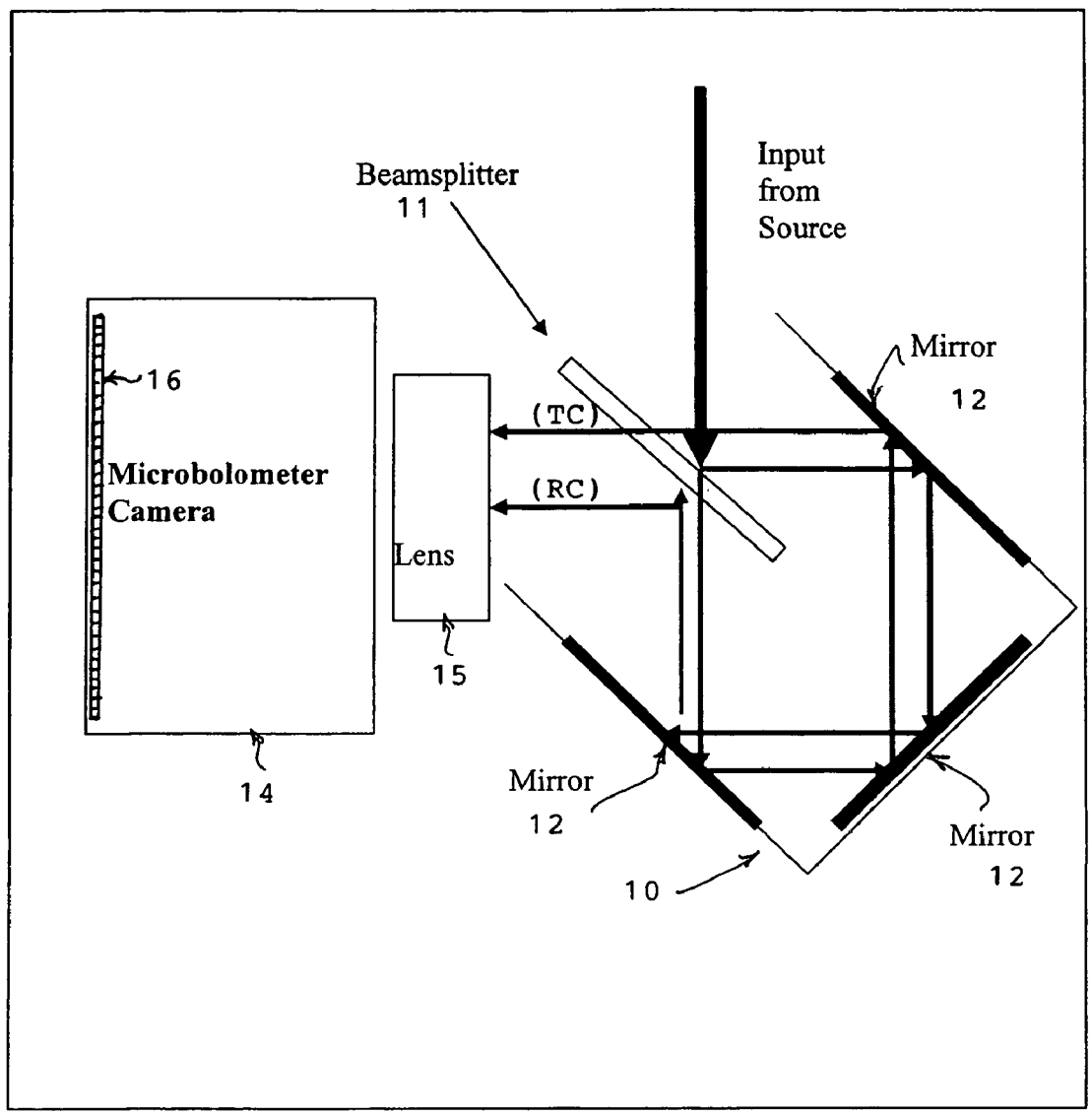
FIG. 1 is a schematic diagram illustrating a box interferometer is used with a microbolometer having an uncooled thermal IR detector array in accordance with the invention.

Referring to FIG. 1, a box interferometer 10 is used with a microbolometer camera 14 having a front lens 15 and an uncooled thermal IR detector array 16 (shown schematically at the back of the camera). The interferometer is oriented at an angle to face its aperture toward an input light source to one side (input from source at top of diagram). The input light is incident on a beamsplitter 11 that splits the beam into a wavelength component that is reflected (RC) by the beamsplitter surface and directed by side mirrors 12 toward the camera lens, and another wavelength component that is transmitted (TC) through the beamsplitter surface and directed by side mirrors 12 toward the camera lens. As a result, the reflected and transmitted components are of different spectral wavelengths and separated spatially where they impact the microbolometer detector array. This produces an image with hyperspectral separation that can differentiate between spectral components of light received from the source subject.

In a test embodiment, the instrument employs a Sagnac interferometer that provides the wavefront division required for interferometry. Like a version of an imaging Michelson, the scene is imaged through the interferometer producing a two dimensional image upon which the interference pattern is superimposed. The interference pattern is spatially imposed on the scene rather than temporally. In order to build up a true three dimensional spectral data set, the scene is then scanned by the microbolometer across the interference pattern, in the same sense as a pushbroom imaging spectrometer. The microbolometer obtains this effect by exposure across the elements of its IR detector array. This allows the microbolometer to be used as an uncooled camera component avoiding excess volume, weight, heat, and power demand that would be unacceptable in the intended environments of use, such as military UAV surveillance vehicles, small mobile platforms, and extraterrestrial environments.

The Sagnac box configuration has the benefit of a slightly larger available field of view (10 degrees) versus other configurations. The scene is viewed through the interferometer by the camera, thus the interferometer must be large enough to accept both the clear aperture and field of view of the camera to optimize performance.

Figure 2:
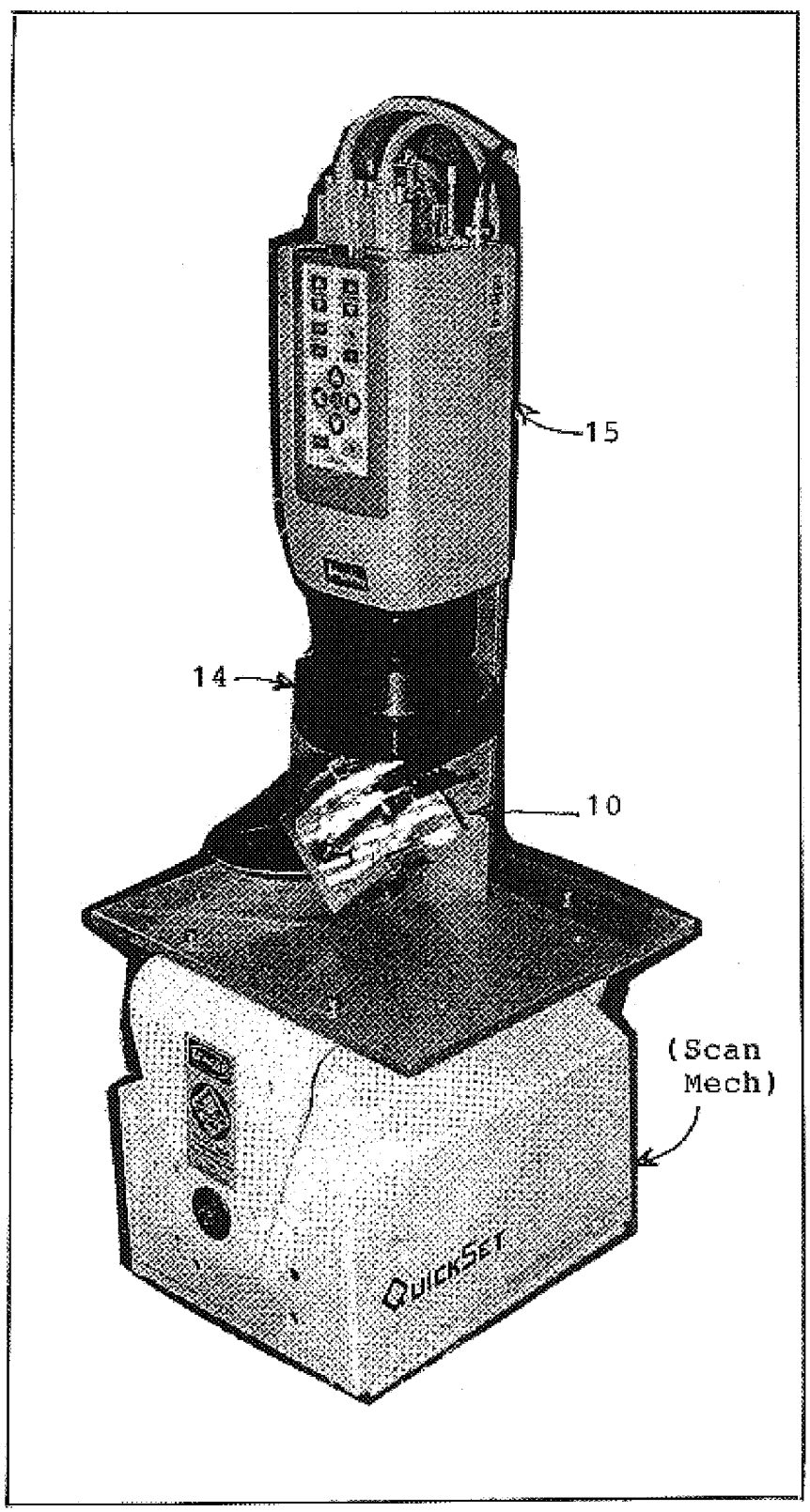
FIG. 2 illustrates the microbolometer camera mounted on top of the interferometer which has its aperture oriented for viewing to the left of the figure.

In FIG. 2, the assembled instrument consisted of the microbolometer camera (top of photograph), interferometer (middle), and a scan mechanism (lower unit). An Indigo Merlin microbolometer camera was used. Two versions of the instrument were implemented, one with a 25 mm lens that has a field of view much larger than the interferometer can accept, but has an unobstructed clear aperture, and the second with a 100 mm focal length lens that has a field of view smaller than the interferometer limit, but a much larger clear aperture. The former case limits the spectral resolution and the latter case limits the sensitivity.

Figure 3:
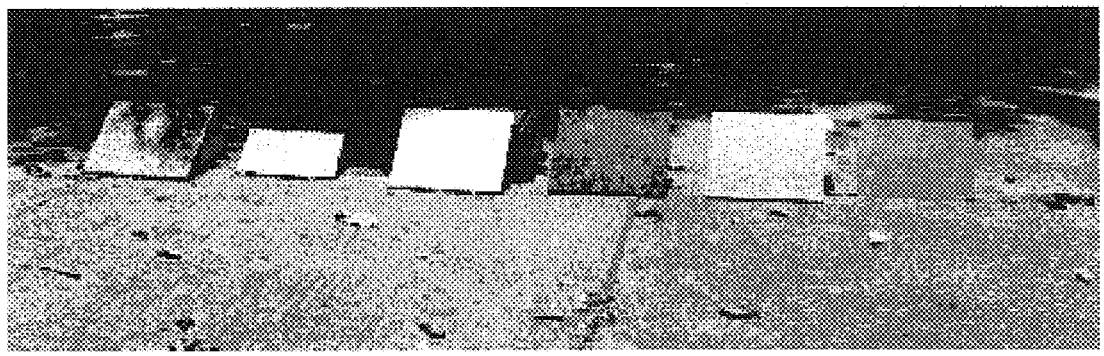
FIG. 3 shows an array of stone tiles set up as a test for hyperspectral imaging, including tiles of carbonates, granites and one painted panel.
Figure 4A:
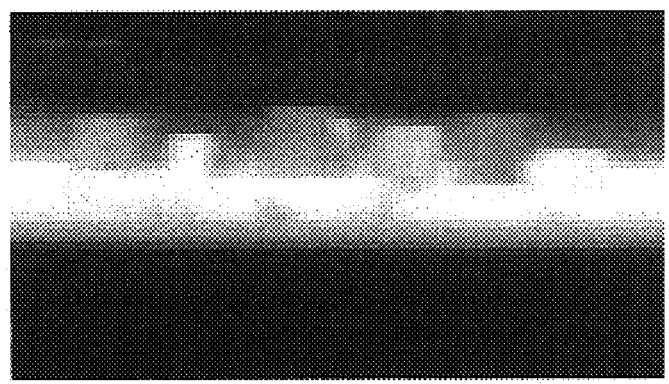
FIG. 4A shows a single band of the test image at 11 microns taken of the tile set in FIG. 3.
Figure 4B:
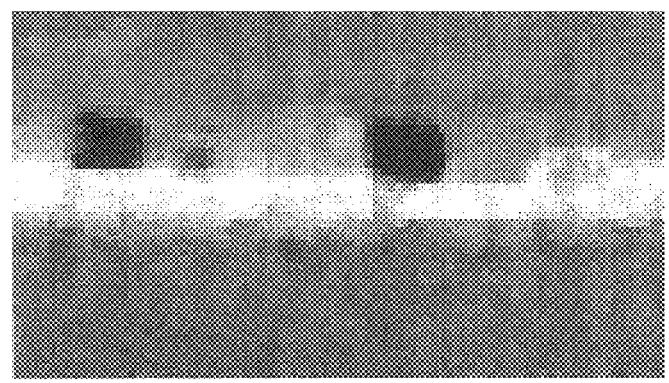
FIG. 4B is an RGB composite of three principal wavelength components.

FIG. 3 illustrates a first imaging demonstration in which a line of stone tiles was set up to provide an input light signal to the instrument. The stone tiles included tiles of carbonates, granites and one painted panel. Interferograms were collected, assembled into an image and transformed into spectra forming an image cube. FIG. 4A shows a single band of the test image at 11 microns (with 2 mrad resolution from a range of 30 meters). FIG. 4B is an RGB composite of three principal wavelength components. The granite panels show as dark purple, the carbonate as pale yellow. The small pink panel is a board coated with quartz sand.

Analysis of the calibration data for this experiment shows a peak signal to noise ratio of over 200, with the spectral resolution of 20 wavenumbers. The data set was collected very rapidly, requiring only 2 seconds to acquire the entire spectral cube.

Figure 5:
FIG. 5 shows an RGB composite of another experiment imaging only granite panels (one almost black and the other rich in pink feldspar).

The second test version uses a longer focal length lens allowing illuminating more of the array for more spatial coverage and spectral resolution. However, only about 20 percent of the large input aperture of this lens was used leading to low signal to noise ratio. This experiment imaged only the granite panels (one almost black and the other rich in pink feldspar). In FIG. 5, an RGB composite using wavelengths chosen to maximize the difference between the panels and the background showed the panels separated from each other and the background, despite the low sensitivity of the instrument. The composite used bands at 8, 9, and 10 microns. On the left side of the figure, the pink granite panel shows evidence of its coarse grained nature, despite the low signal to noise of the data.

Figure 6:
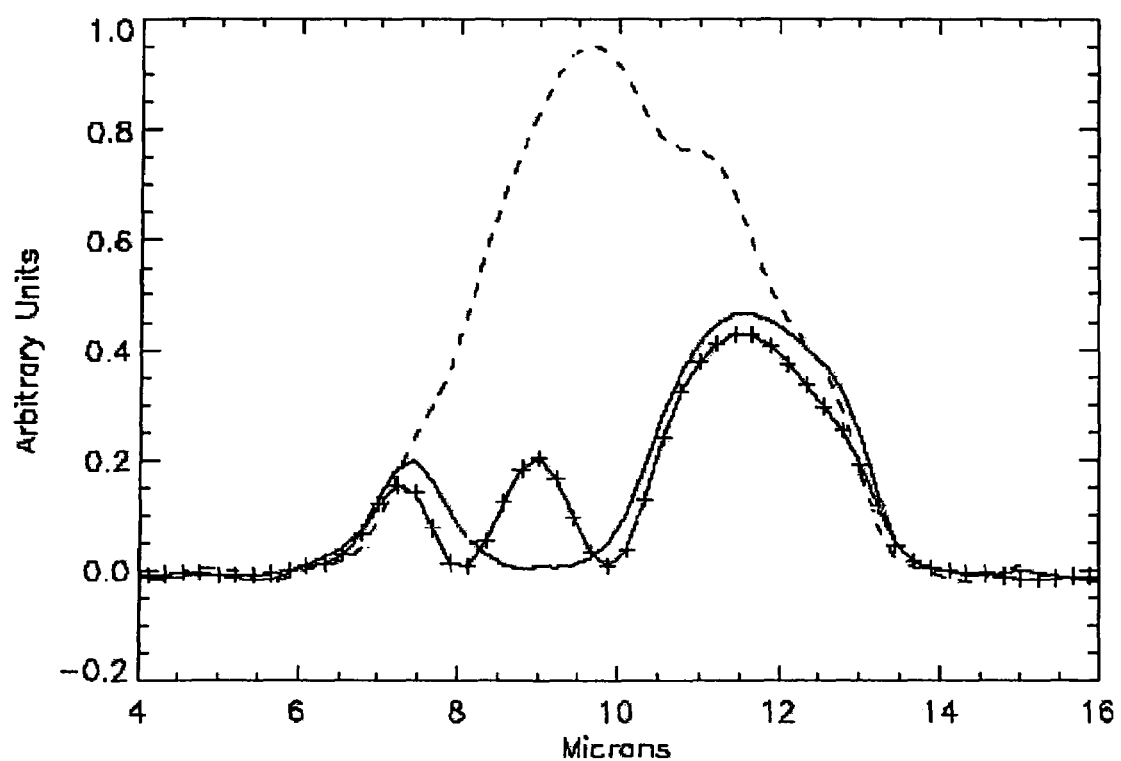
FIG. 6 shows a spectral sample extracted from the tile set image data used for FIG. 5.

FIG. 6 shows spectra extracted from these data showing clear detection of spectral features. In part the data have low sensitivity because we chose to scan very rapidly because of rapidly changing environmental conditions. The total time to acquire the data presented was 2 seconds. All spectra are in raw instrumental counts, only corrected for nonuniformity of response of the detector array. In this case zero represents the radiance of the interferometer. The dotted curve is the spectrum of the concrete sidewalk under the panels. The solid curve is the dark granite dominated by quartz. The solid curve with symbols is the panel with abundant pink feldspar. The silicate features are clearly displayed and show significant differences, A combination of calculation and scaling to our experiments shows further improvements are feasible. The experiment which allowed using the full clear aperture of the 25 mm lens, with restricted field of view provides the critical data. Theory predicts that the full signal to noise ratio of an imager can be recovered from an interferometer is the system is not photon-noise dominated, less transmission and modulation losses. We measured the per pixel signal to noise ratio of the Indigo Merlin camera used for the experiments at 600 for each frame at a data collection rate of 50 Hz. Our measured spectral signal to noise per channel per spatial pixel at 20 wavenumber resolution was 200 using a complete radiometric calibration of the interferometer spectrometer system. This factor of three loss in signal to noise ratio is reasonable as the Sagnac loses 50% of its light out the front of the interferometer, and the modulation of our beamsplitter is about 80%.

In a flight system, the optics would be sized to fully illuminate the detector array without losses. The full resolution of the system would be captured without noise penalty as we would have interferograms 5 times longer (256 vs. 50 pixels). Therefore, in a frame with only 20 ms integration using a low-noise array, we should be able to achieve a signal to noise ratio of over 200 hundred. Co-adding 5–10 frames would bring the SNR to higher levels of performance in terms of signal to noise ratio. Thus, temporally co-added spectra can be collected at a rate of 320 pixels about 5 times per second, and to cover a 256 element scene would require only 50 seconds.

In a further test, a Sagnac interferometer was used as the image plane interferometer, and an Indigo Merlin microbolometer array camera with a 320×244 element array was used as the detector. The camera was equipped with a 50 mm f/1.4 IR lens and viewed the scene through the interferometer with field of view of 18×14 degrees. The measured sensitivity of the camera used in this experiment was 95 mK with the lens described. The geometry of Sagnac interferometers limits the field of view of the system to about 7 degrees so the image is substantially vignetted. The vignetted portion of the array was excluded from analysis leaving 120×177 pixels active. The optics of the Sagnac are 50 mm gold mirrors and a 50 mm zinc selenide beamsplitter so the central portion of the image is not vignetted and uses the full f-number of the lens. The system viewed a motorized mirror to provide the necessary scanning from a stationary position. A flat plate blackbody calibrator with adjustable temperature was used for calibration.

Figure 7:
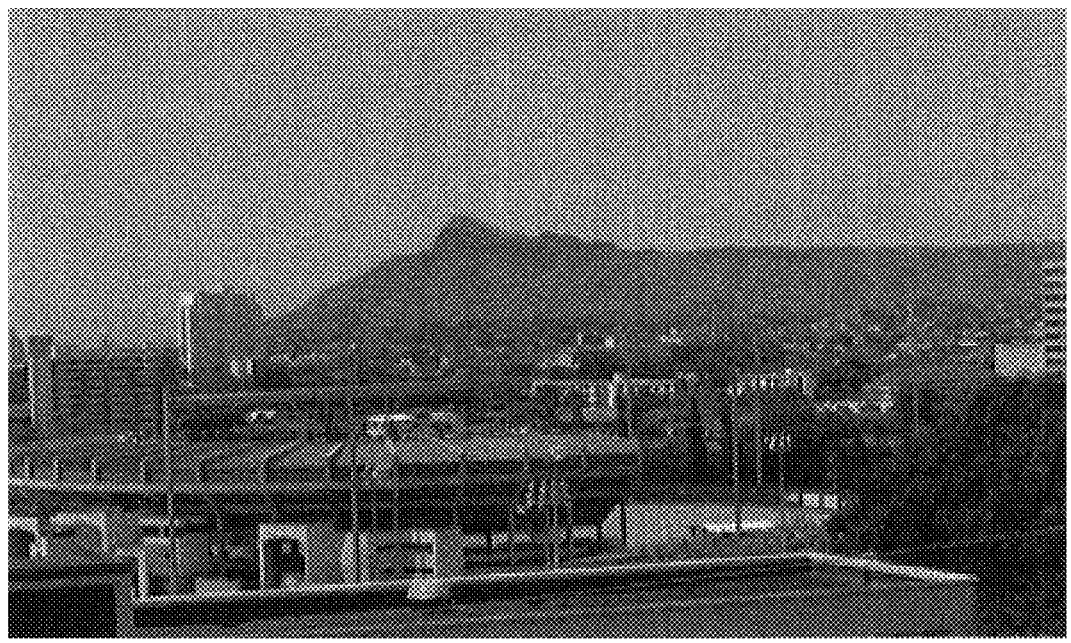
FIG. 7 shows a photograph of a scene to be imaged with the uncooled LWIR hyperspectral imager.
Figure 8:
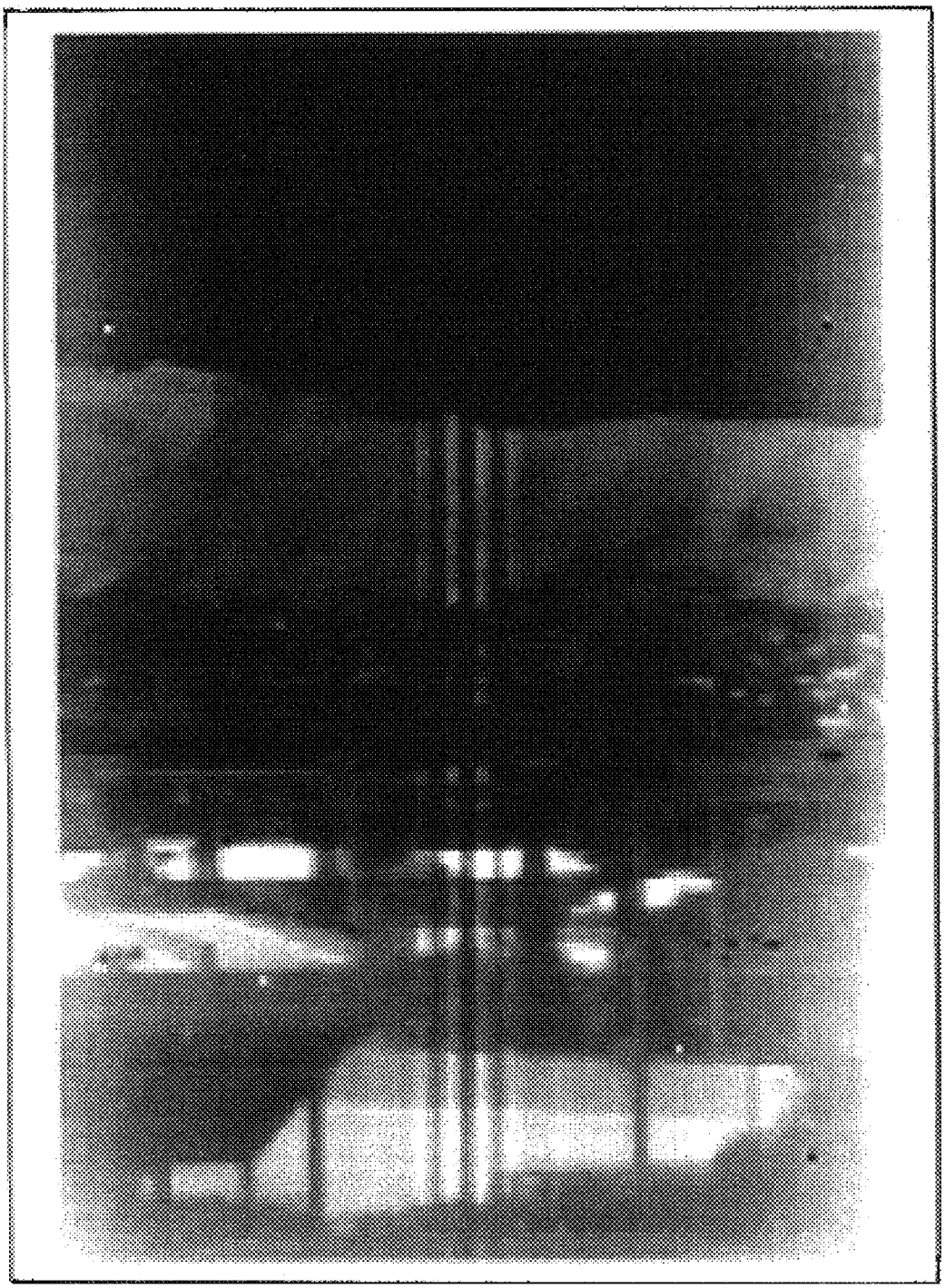
FIG. 8 shows a single frame of microbolometer data of the scene with fringes arising from the interferometer superimposed.

Using this instrument, data was collected both of a urban scene, and blackbody calibration sources. FIG. 7 shows a photograph of the scene to be imaged, which includes the Hawaii landmark Diamond Head and portions of urban and suburban Honolulu near the University of Hawaii Campus. A typical frame from the data collected is shown in FIG. 8, where the interference fringes superimposed by the Sagnac interferometer on the scene are evident. The data cube was constructed via the method published by Horton et al., by scanning the image across the scene slowly enough that the scan has advanced one pixel or less between each frame acquired at 50 Hz. See, Horton, Richard F., Conger, C. A., Pellegrino, L. S., "High etendue Imaging Fourier Transform Spectrometer: initial results", Proc. SPIE Vol. 3118, p. 380–390, Imaging Spectrometry III, Michael R. Descour, Sylvia S. Shen, editors, 1997.

Figure 9:
FIG. 9 shows an image reconstructed from the sequence of images obtained that was derived from a single column that corresponds to a single optical path difference of the interferometer.
Figure 10:
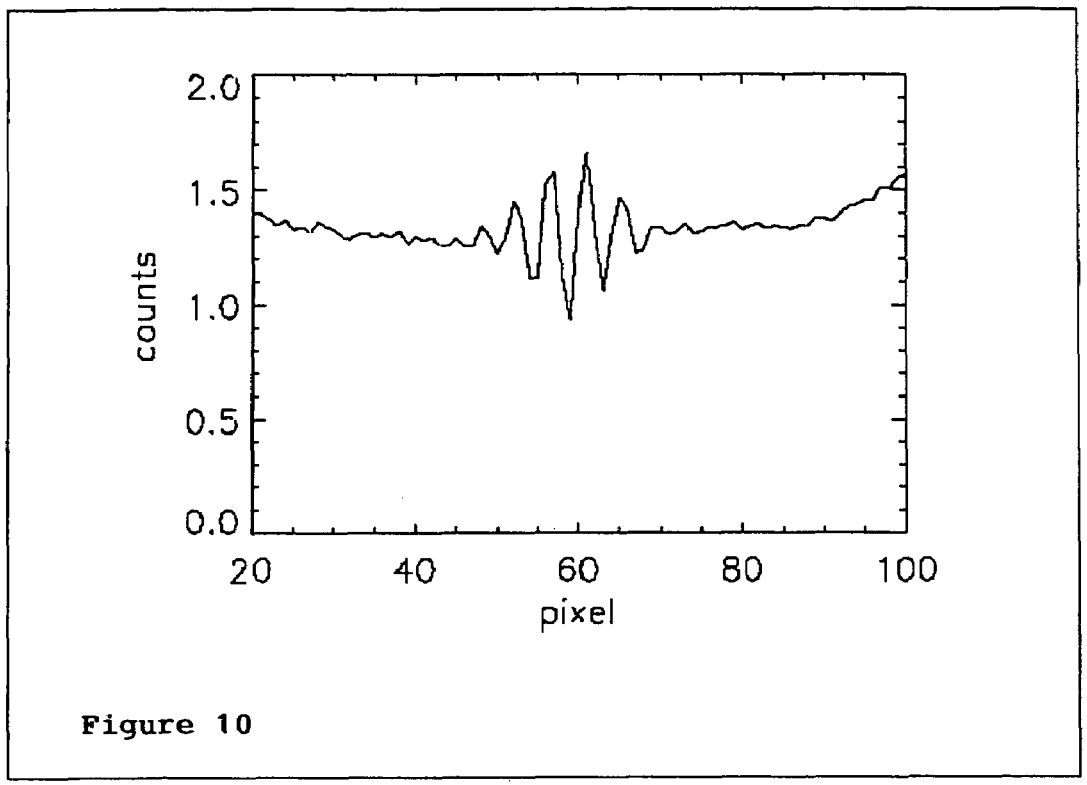
FIG. 10 shows a typical interferogram extracted from the reconstructed image cube obtained in FIG. 9.

In this case, the scan rate advanced the image ¼ pixel during a frame time of 20 ms. Each column of the array corresponds to a different optical path difference. As the scene is scanned, the images are obtained by each column in the fashion of a linescanner, as shown in FIG. 9. The images obtained by each column are registered to produce an image cube consisting of interferograms. A typical interferogram extracted from the data cube is shown in FIG. 10. Prior to registration, each image was corrected for gain and offset using images of the blackbody at two temperatures observed with the path difference adjusted to zero to provide a uniform unmodulated field.

Figure 11:
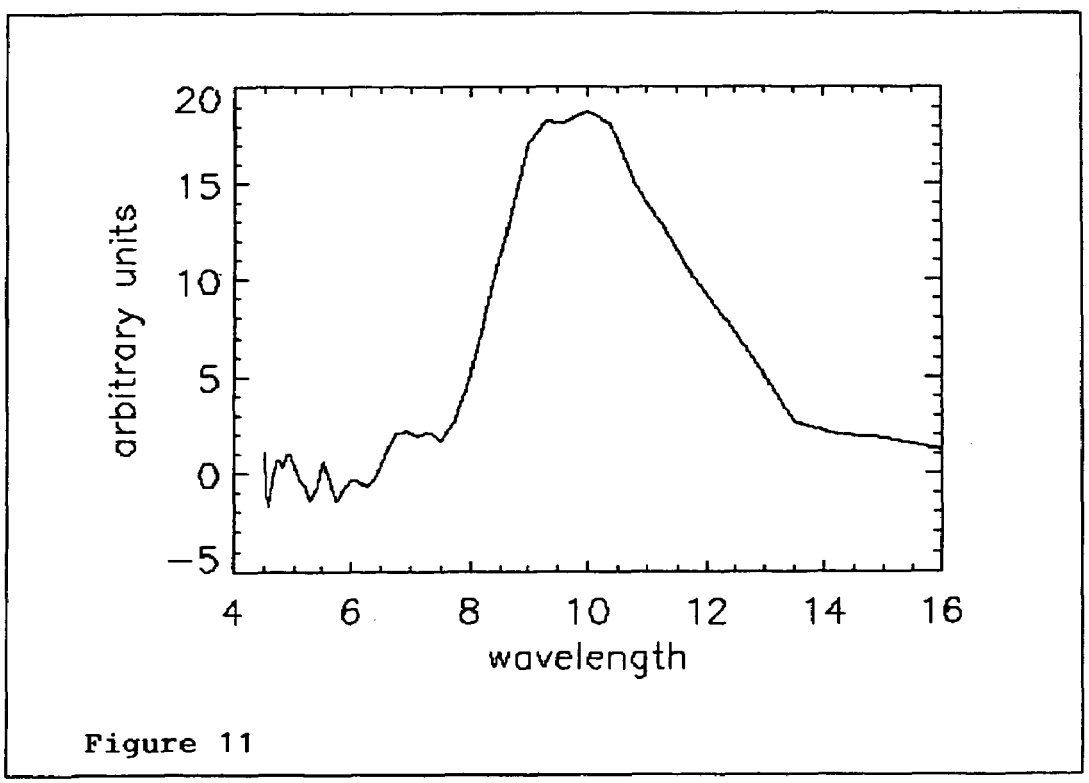
FIG. 11 shows a raw spectrum produced from a phase corrected interferogram from FIG. 10.
Figure 12:
FIG. 12 shows a single band image extracted from the scene image data at 10 microns.

To produce calibrated spectra, each interferogram was fit with a parabola and the fit subtracted to zero-mean the data. Then the interferograms were phase corrected using the method published by Mertz. See, Mertz, L., "Transformations in Optics", Wiley, N.Y., 1965. The interferograms were then transformed to the spectral domain, as shown in FIG. 11. This process was also applied to interference images of the blackbody source at two temperatures to construct gain and offset calibration spectra. These data were used to calibrate the spectral images to radiance, and to correct spatially varying modulation of the interferometer. FIG. 12 shows a single band extracted from the data. The occasional horizontal lines running through the image are due to defective pixels that corrupted individual interferograms.

The wavelengths were calibrated only approximately. The peak response of the system was assumed to be 10 microns. This spectral channel was set to 1000 wavenumbers and the wavelength derived from this and the zero frequency. The spectral resolution determined by the cutoff frequency divided by half the interferometer samples was 33 wavenumbers, or about 300 nm.

Figure 13:
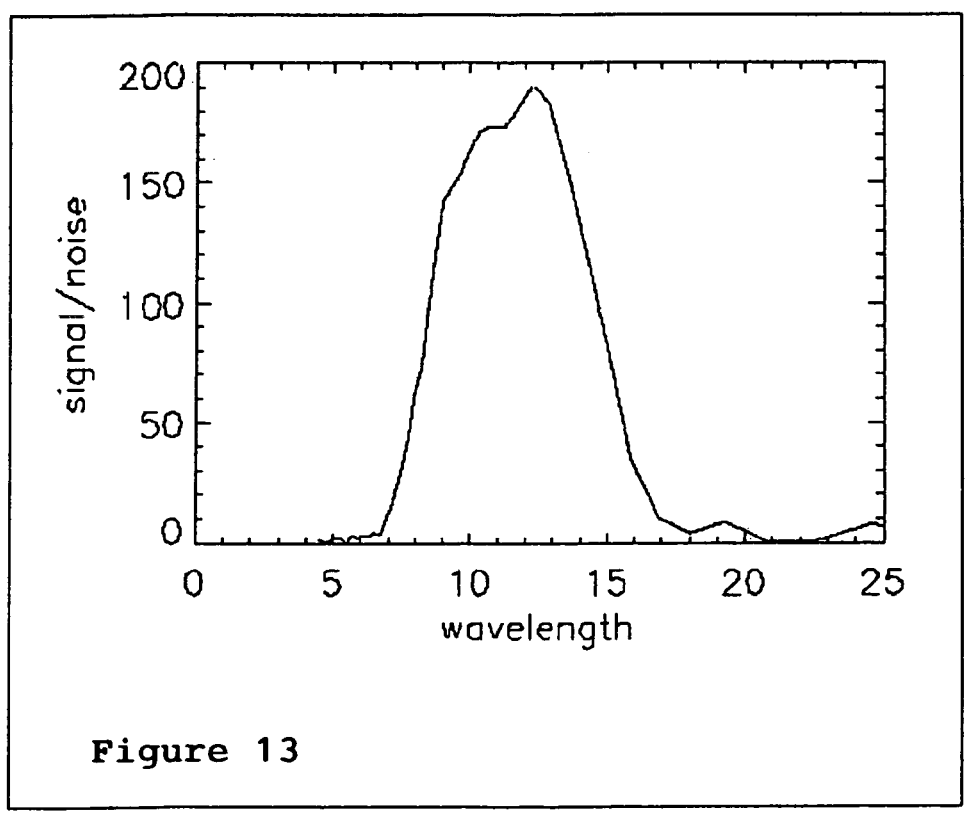
FIG. 13 shows a graph of the measured signal-to-noise ratio versus wavelength.

The signal to noise ratio can be measured by observing a blackbody at a temperature intermediate to the two calibration temperatures with the same parameters and algorithms used to calibrate the urban scene. The intermediate blackbody was calibrated to radiance, then the variation in the calibrated radiance over time was measured computed as standard deviation was ratioed to the mean radiance for each wavelength. See, Lucey, Paul G., Winter, Edwin M., "Requirements for calibration of focal plane arrays for imaging spectrometers", Proc. SPIE Vol. 3498, p. 305–310, Sensors, Systems, and Next-Generation Satellites II, Hiroyuki Fujisada, editor, 1998. The SNR curve as a function of wavelength is presented in FIG. 13, showing a peak SNR near 200.

The signal noise ratio achieved in this test was obtained at sufficient spectral resolution and rate (50 Hz frame rate) to be useful for some applications such as mine detection. However, significant improvements over this performance almost certainly can be demonstrated. First, literature reports of sensitivities for microbolometer arrays almost 10 times that of the camera used here would dramatically improve the values obtained in these tests. See, Murphy, Daniel F., Ray, Michael, Wyles, Richard, Asbrock, James F., Lum, Nancy A., Wyles, Jessica, Hewitt, C., Kennedy, Adam, Van Lue, David, Anderson, John S., Bradley, Daryl, Chin, Richard, Kostrzewa, Thomas, "High-sensitivity 25-micron microbolometer FPAs", Proc. SPIE Vol. 4721, p. 99–110, Infrared Detectors and Focal Plane Arrays VII, Eustace L. Dereniak, Robert E. Sampson, editors, 2002; and Howard, Philip E., Clarke, John E., Parrish, William J., Woolaway, James T., "Advanced highperformance 320×240 VOx microbolometer uncooled IR focal plane", Proc. SPIE Vol. 3698, p. 131–136, Infrared Technology and Applications XXV, Bjorn F. Andresen, Marija Strojnik Scholl, editors, 1999. The optics used in the tests was f/1.4, but somewhat faster optics are available and would also provide some gains.

A larger interferometer would allow the entire array to be used, more than doubling the spectral resolution with no penalty in SNR. A Mach-Zender interferometer has a shorter path and would allow a more compact design while preserving field of view and f-number. Further, the Mach-Zender does not discard half the light, so a root 2 gain results from the use of that interferometer. The combination of a higher sensitivity (but existing) array and perhaps faster optics (f/1) and a Mach-Zender dual focal plane design should bring performance in the range of SNR=1000, with spectral resolutions near 10 wavenumbers, while still obtaining data at 50 Hz, acceptable for airborne hyperspectral imaging. See, Horton, Richard F., "Optical design for a high-etendue imaging Fourier-transform spectrometer," Proc. SPIE Vol. 2819, p. 300–315, Imaging Spectrometry II, Michael R. Descour, Jonathan M. Mooney, editors, 1996. This performance would be achieved without the need for cryogenic cooling. However, the Sagnac interferometer is simpler to align and to maintain alignment.

In summary, a microbolometer imaging camera using an uncooled infrared detector array can be effectively used with an "image plane" interferometer to produce usable spectral imaging. The results can be applied to imaging Michelson interferometers as well, as the signal and noise advantages of imaging Michelson interferometers are equivalent to the "image plane" interferometer. The results indicated that the signal to noise ratios obtained are high and consistent with prediction. System design issues need to be optimized for an operational system, including matching the field of view and clear aperture to the fast optics desired, correcting for optical distortions that give rise to spectral artifacts, and compensating for motion of objects in the scene during data collection. These systems issues can be resolved by employing other known techniques such as wedge or step filter spectrometers, AOTF spectrometers, and imaging Michelson interferometers. Commercial microbolometer cameras have sufficient sensitivity so that the type of interferometric hyperspectral imaging obtained herein can be an appropriate application. Improved sensitivity as indicated in ongoing research could result in uncooled hyperspectral imagers competitive with some cooled systems.

It is understood that many modifications and variations may be devised given the above description of the principles of the invention. It is intended that all such modifications and variations be considered as within the spirit and scope of this invention, as defined in the following claims.

The invention claimed is:

1. A method for hyperspectral imaging in small platform environments, comprising:

receiving an input from a light source to be imaged using an interferometer as a front end and providing a reflected light component and a transmitted light component of different spectral wavelengths which are spatially separated from each other as outputs;

receiving the reflected light and transmitted light component outputs of the interferometer using a camera having a detector array and providing an imaging output of a two dimensional image upon which the interference pattern is superimposed; and producing a three dimensional spectral image by scanning with the camera across the interference pattern like a pushbroom imaging spectrometer.

2. A method according to claim 1, wherein said interferometer is a Michelson type interferometer.

3. A method according to claim 1, wherein said interferometer is a box type interferometer having an aperture facing toward an input light source which receives input light incident on a beamsplitter and reflected and transmitted components from the beamsplitter are combined on a two-dimensional image plane.

4. A method according to claim 1, wherein said camera is an uncooled microbolometer camera.

5. A method according to claim 1, wherein the interferometer is a box type interferometer with no moving parts and having an aperture facing toward an input light source which receives input light incident on a beamsplitter and reflected and transmitted components from the beamsplitter are combined on a two-dimensional image plane, and the camera is an uncooled microbolometer camera with thermal IR detector array used with the interferometer to obtain usable hyperspectral IR imaging with acceptable to high signal-to-noise ratio (SNR).

6. A method according to claim 5, wherein said interferometer and microbolometer camera are configured for hyperspectral imaging in the 8–14 micron region of thermal infrared or long-wave infrared (LWIR).

7. A method according to claim 5, wherein said interferometer and microbolometer camera are configured for use on UAV vehicles, small mobile platforms, or in extraterrestrial environments.

8. A method according to claim 5, wherein said interferometer and microbolometer camera are configured to provide signal-to-noise ratios near 200 for ambient temperature scenes with 33 wavenumber resolution at a frame rate of 50 Hz.

* * * * *